US007639656B2

(12) United States Patent
Dooley et al.

(10) Patent No.: US 7,639,656 B2
(45) Date of Patent: Dec. 29, 2009

(54) PROTOCOL FOR COMMUNICATION BETWEEN ACCESS PORTS AND WIRELESS SWITCHES

(75) Inventors: John Dooley, San Jose, CA (US); Mike Shiba, San Jose, CA (US); Dan Scheve, San Jose, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 976 days.

(21) Appl. No.: 10/834,742

(22) Filed: Apr. 28, 2004

(65) Prior Publication Data

US 2005/0243737 A1 Nov. 3, 2005

(51) Int. Cl.
*H04W 4/00* (2009.01)
*G06F 15/16* (2006.01)
*H04J 4/00* (2006.01)

(52) U.S. Cl. .................... 370/338; 370/392; 370/395.1; 370/401; 709/203; 709/236; 709/232; 455/566

(58) Field of Classification Search ................ 370/310, 370/328, 349, 338–437; 709/203, 236, 232; 455/466

See application file for complete search history.

(56) References Cited

U.S. PATENT DOCUMENTS

| | | | |
|---|---|---|---|
| 5,546,397 A | | 8/1996 | Mahany |
| 6,741,853 B1 * | | 5/2004 | Jiang et al. .................. 455/418 |
| 6,873,611 B2 * | | 3/2005 | Rios .......................... 370/338 |
| 7,010,300 B1 * | | 3/2006 | Jones et al. ................. 455/439 |
| 7,027,425 B1 * | | 4/2006 | Fullerton et al. ............. 370/338 |
| 7,142,099 B2 * | | 11/2006 | Ross et al. ................... 340/438 |
| 7,155,518 B2 * | | 12/2006 | Forslow ...................... 709/227 |
| 7,321,578 B2 * | | 1/2008 | Rios .......................... 370/338 |
| 7,414,995 B1 * | | 8/2008 | Melkote et al. ............. 370/338 |
| 2001/0012296 A1 | | 8/2001 | Burgess et al. |
| 2003/0007464 A1 * | | 1/2003 | Balani ........................ 370/310 |
| 2003/0031160 A1 * | | 2/2003 | Gibson Ang et al. ........ 370/349 |
| 2003/0177267 A1 * | | 9/2003 | Orava et al. ................. 709/245 |
| 2003/0212821 A1 * | | 11/2003 | Gillies et al. ................ 709/238 |
| 2004/0029525 A1 * | | 2/2004 | Vertelney .................... 455/3.03 |
| 2004/0044454 A1 * | | 3/2004 | Ross et al. .................... 701/33 |
| 2004/0047320 A1 * | | 3/2004 | Eglin ......................... 370/338 |
| 2004/0235468 A1 * | | 11/2004 | Luebke et al. ............. 455/426.1 |
| 2005/0030160 A1 * | | 2/2005 | Goren et al. ................ 340/10.5 |
| 2005/0058111 A1 * | | 3/2005 | Hung et al. ................. 370/338 |
| 2005/0059396 A1 * | | 3/2005 | Chuah et al. ............. 455/435.1 |
| 2005/0102529 A1 * | | 5/2005 | Buddhikot et al. .......... 713/200 |
| 2005/0124359 A1 * | | 6/2005 | Willins et al. ............... 455/466 |
| 2005/0223111 A1 * | | 10/2005 | Bhandaru et al. ........... 709/236 |
| 2005/0243737 A1 * | | 11/2005 | Dooley et al. ............... 370/254 |
| 2006/0155803 A1 * | | 7/2006 | Muramatsu et al. ......... 709/203 |
| 2007/0118389 A1 * | | 5/2007 | Shipon .......................... 705/1 |

* cited by examiner

*Primary Examiner*—Ayaz R Sheikh
*Assistant Examiner*—Venkatesh Haliyur

(57) ABSTRACT

A wireless local area network includes access ports which communicate over a wired network with wireless switches which control the access ports and bridge data between portals in the access ports and another network. Code for operating the access ports and for configuring the portals is separately downloaded from the wireless switch. Where an access port includes more than one portal, separate ethernet addresses are assigned to the processor of the access port and to the portals for communications with the wireless switch. The protocol may provide separate sequence numbers for the communications and include a command field.

5 Claims, 4 Drawing Sheets

PROTOCOL FOR COMMUNICATION BETWEEN ACCESS PORTS AND WIRELESS SWITCHES

BACKGROUND OF THE INVENTION

This invention relates to wireless local area networks such as those following the protocols of IEEE Standard 802.11. In particular this invention relates to networks arranged to use wireless switches and access ports, such as the networks described in copending application Ser. No. 09/528,697, filed Mar. 17, 2000, the specification of which is incorporated herein by reference. It should be understood that the term "access port" as used in this application is the commercial name for the device referred to as an "RF Port" in the referenced copending application and the term "wireless switch" as used in this application is the commercial name for the device referred to as "Cell Controller" in the referenced copending application. The wireless switches of the present invention may also correspond to the cell controllers described in copending provisional application Ser. No. 60/473,755, filed May 28, 2003, the specification of which is incorporated herein by reference.

New technologies are currently evolving that make it desirable to support different communications protocols and different media using the wireless switches, to interface additional devices to the wired network containing the wireless switch by radio, fiber optics or serial data paths using other media, including wires.

It is an object of the present invention to provide a new and improved communications format that can accommodate multiple technologies in connection with communications between a wireless switch and an access port.

SUMMARY OF THE INVENTION

In accordance with the invention there is provided an improved method for configuring access ports in a wireless local area network, wherein a wireless switch controls the operation of one or more access ports and manages data communications with the one or more access ports, and wherein the access ports include one or more portals for communicating data to other devices. Software for operation of the access port is downloaded from the wireless switch. The access port sends data representing the identification of the one or more portals of the access port to the wireless switch. Data to configure the one or more portals of the access port is downloaded from the wireless switch to the access port.

In accordance with the invention there is provided an access port configured using the foregoing method.

In accordance with the invention there is provided an improved method for communicating in a wireless local area network, wherein a wireless switch controls the operation of one or more access ports and manages data communications with the access ports, and wherein at least one of the access ports includes an access port processor and a plurality of portals for communicating data to other devices. Separate network addresses corresponding to the access port processor and the portals are provided. Messages between the access port processor and the wireless switch are sent using a network address corresponding to the access port processor; and messages between the portals and the wireless switch are sent using network addresses assigned to the portals.

In a preferred embodiment sequence numbers are assigned to data messages between the access port and the wireless switch, wherein separate series of sequence numbers are assigned to each of the access port processor and the plurality of portals. The data messages may have an ethernet format, including a first ethernet header and a second header, wherein the ethernet header includes the network address and wherein the second header includes the sequence number. The second header may also include a message length field and/or a command field identifying message direction and message type. The second header may optionally include a code field indicating a command code for processing data in the message.

In accordance with the invention there is provided a wireless local area network arranged to operate using the method of the invention.

For a better understanding of the present invention, together with other and further objects, reference is made to the following description, taken in conjunction with the accompanying drawings, and its scope will be pointed out in the appended claims.

BRIEF DESCRIPTION OF THE DRAWINGS

Throughout the figures, unless otherwise stated, the same reference numerals and characters are used to denote like features, elements, components, or portions of the illustrated embodiments.

DESCRIPTION OF THE INVENTION

As used in this specification the following terms have the following meanings:

An Access Port is a device with an Ethernet connection that contains at least one Portal.

A Portal is any device that is contained in an Access Port that provides a communication channel to some other device or network. A portal may be an IEEE 802.11 radio, a radio that uses some other technology than those described in IEEE 802.11 specifications, or a non-radio device such as a serial channel, fiber-optic link, etc. An access port may contain multiple portals for communicating using different protocols, such as different versions of IEEE 802.11.

A Wireless Switch is a device that controls one or more Access Ports and bridges data between these devices to a different network, typically a wired Ethernet network.

Adoption is the process by which an access port becomes associated with a wireless switch.

A message is a complete unit of data, as seen by the logic that is to process that data. Size restrictions on a particular network may force the "message" to be broken into multiple "packets" or "frames" for transmission on that network.

A packet or frame is a single unit of data as handled by a network. A data unit that is handled as a single entity on one type of network may have to be broken into multiple units for transmission on a different type of network. The term "packet" always refers to the unit of data as seen on the particular network involved.

Figure 1:
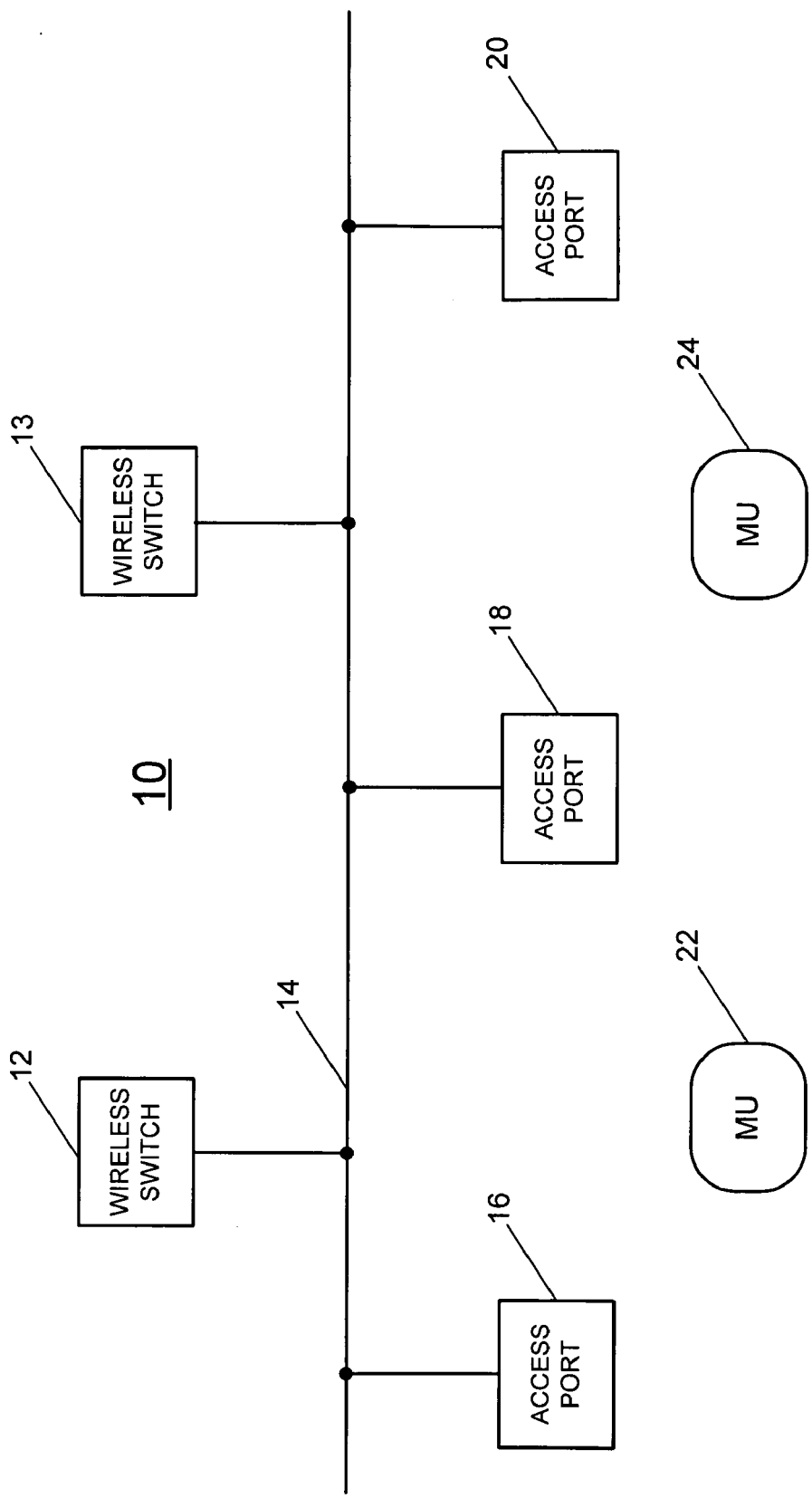
FIG. 1 is a block diagram illustrating an example of a wireless local area network in which the method of the invention may be practiced.

Referring to FIG. 1 there is illustrated an example of a wireless local area network 10 as described in referenced co-pending application Ser. No. 09/528,697, wherein wireless switches 12, 13 (called cell controllers in the referenced application) communicate over an ethernet 14 with access ports 16, 18 and 20 (called RF Ports in the referenced application). The access ports 16, 18 and 20 are arranged to communicate with mobile units 22, 24 using a protocol such as one or more versions of IEEE Standard 802.11, or other wireless data communications protocol.

Figure 2:
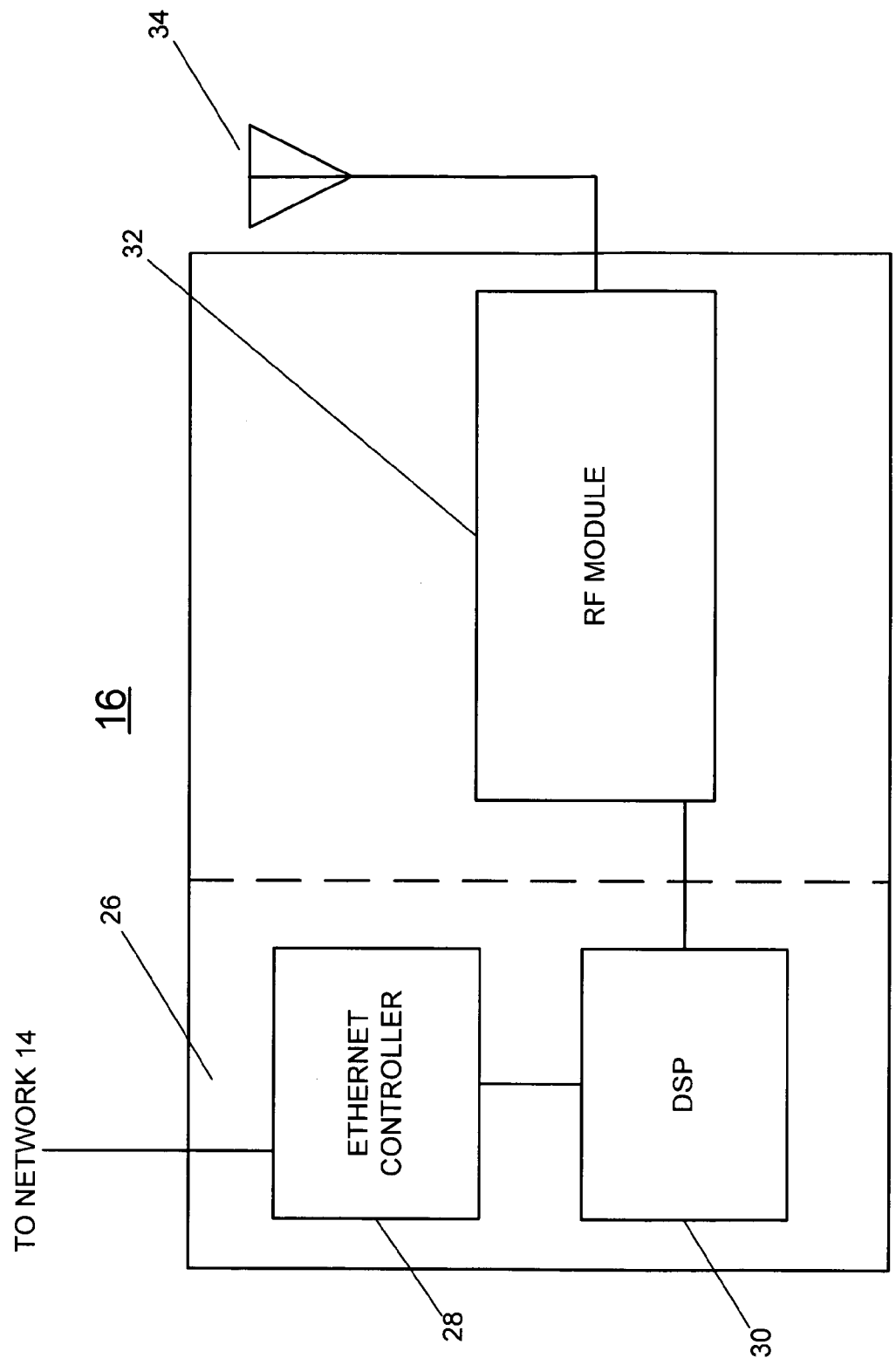
FIG. 2 is a block diagram showing an access port having a single portal in accordance with the prior art.

FIG. 2 illustrated an example of an access port 16 as described in the referenced co-pending application. The access port 16 includes a network interface card 26 (NIC), which includes ethernet controller 28 and digital signal processor 30 (DSP). A radio or RF Module 32 is provided having an antenna 34 for wireless communications with mobile units 22, 24. As described in the referenced application, lower level media access control (MAC) functions are performed in the DSP 30 while higher level MAC functions are performed in the wireless switch 12 or 13 with which the access port is communicating.

Figure 3:
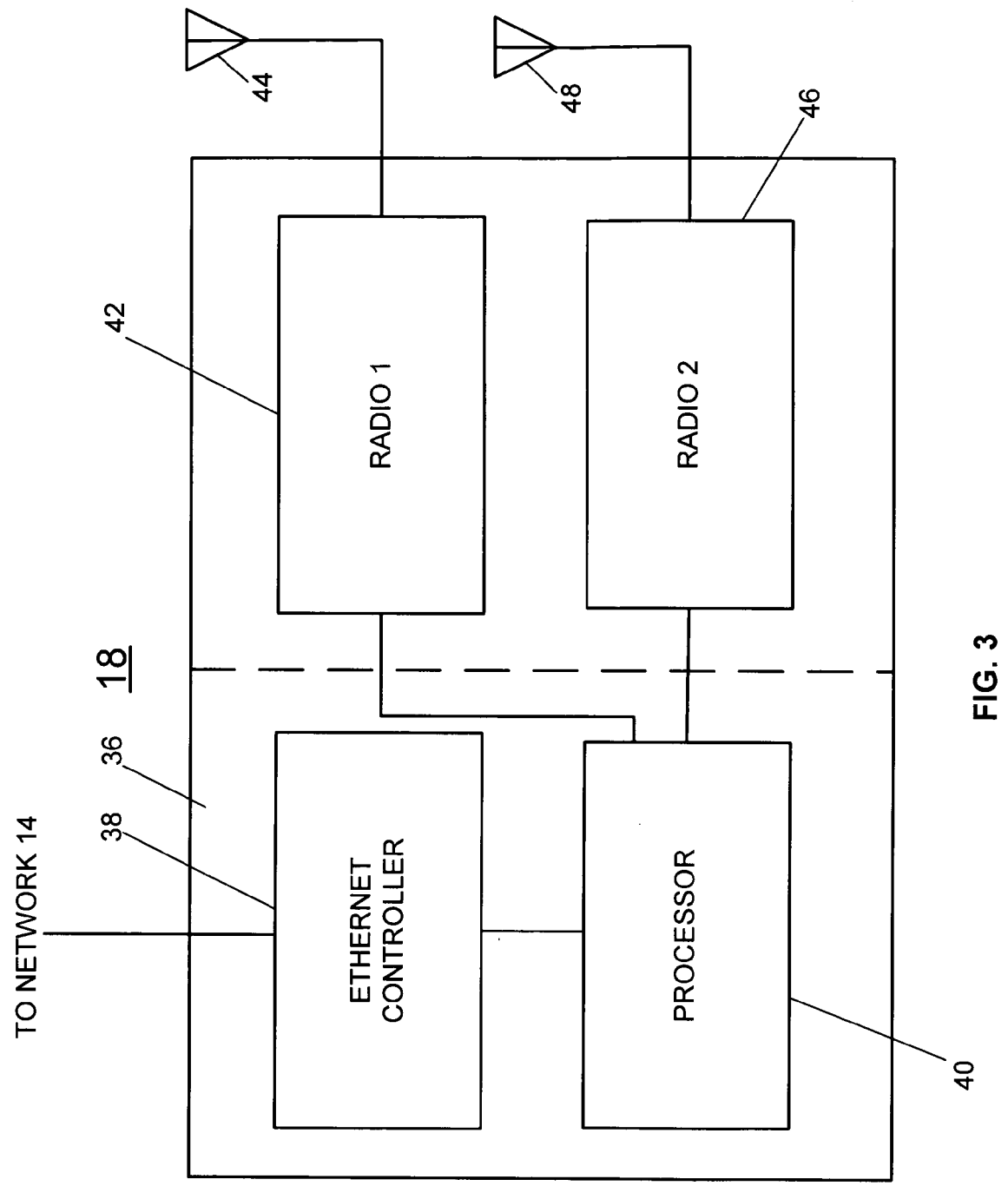
FIG. 3 is a block diagram of a first access port in accordance with the present invention.

FIG. 3 illustrates an example of a first access port 18 in accordance with the present invention which includes two portals. Access port 18 includes a NIC 36 having an ethernet controller 38 and a processor 40. Processor 40 may be a digital signal processor or a microprocessor with associated memory and interfaces for communication with other devices. Access port 18 includes two portals 42, 46, which are designated Radio 1 and Radio 2. Each portal has an antenna 44, 48.

Figure 4:
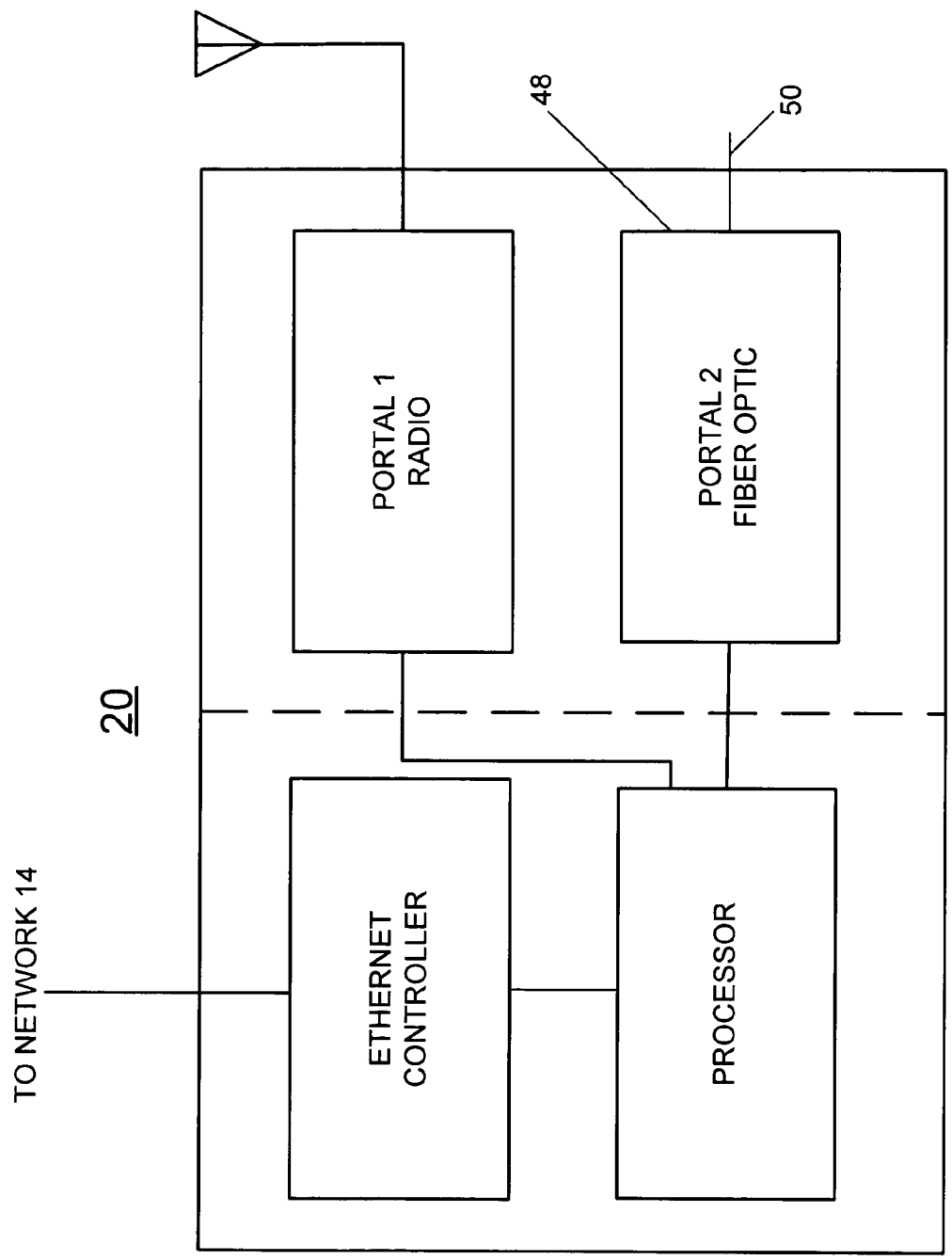
FIG. 4 is a block diagram of a second access port in accordance with the present invention.

FIG. 4 illustrates an example of a second access port 20 in accordance with the present invention. Access port 20 is the same as access port 18, except that the second portal 50 is a fiber optic transducer instead of a radio and arranged to sent and receive serial data by fiber optic transmission line 48.

The present invention provides a protocol for communication between access ports 16, 18 and 20 and wireless switches 12, 13. The protocol includes two versions of some formats, a first version for communicating between a wireless switch 12, 13 and an access port 16 having a single portal. The second version of the protocol is for communicating between wireless switches 12, 13 and access ports 18, 20 having multiple portals. The two versions of the protocol format are compatibly used in the same system, and many of the formats for the two versions are identical.

The present invention further provides an arrangement for downloading runtime code from the wireless switches to the access ports. In the case of access ports having multiple portals, the present invention further provides an arrangement for configuring the portals of an access port.

In the case of multi-portal access ports, there are preferably multiple MAC addresses assigned to the access port. The first is the MAC address for the NIC card and the processor thereon. The remaining MAC addresses are preferably assigned to the portals of the access port. Generally, an operational access port will preferably have at least two MAC addresses, regardless of the number of portals.

All communication between the Wireless Switch and the Access Port processor or Portal within the Access Port uses WISP messages (WISP is an acronym for Wireless Switch Protocol). All fields are in big endian (network order) format. Within each field the highest order bit is shown to the left and the lowest order bit is shown to the right. The WISP message format is shown in Table 1.

TABLE 1

WISP Message Format.

| Ethernet Header (14 bytes) | WISP Header (6 bytes) | Message Body (variable length) | CRC (4 bytes) |

The Ethernet Header portion of the message is the standard IEEE 802.3 header, consisting of the destination MAC address, the source MAC address, and the Ethertype. The Ethertype field may contain the proprietary Symbol Ethertype value of 0x8783 or other value. The Ethernet header is shown in Table 2. The WISP Header is shown in Table 3.

TABLE 2

Ethernet Header.

| Field | size in bytes | Byte offset from start of message | description |
|---|---|---|---|
| destination | 6 | 0 | MAC address of destination. |
| source | 6 | 6 | MAC address of source. |
| ethertype | 2 | 12 | 0x8783 |

TABLE 3

WISP Header.

| Field | size in bytes | byte offset from start of message | description |
|---|---|---|---|
| Command | 2 | 14 | command - direction, type, and code (see Table 4 for details) |
| Sequence | 2 | 16 | sequence number |
| Length | 2 | 18 | Message Body length (the number of bytes following this field) |

The command field is divided into sub-fields as shown in Table 4 below.

TABLE 4

Command sub-fields.

| Field | length in bits | bit number | description |
|---|---|---|---|
| direction | 1 | 15 | Direction in which message is sent. See following paragraph. |
| type | 3 | 14-12 | Message type (message types are listed in Table 5). |
| code | 12 | 11-0 | Command code. Codes for types 0, 1, 2, and 3 messages are listed in Tables 6 through 9, and are described in subsequent sections. The code for type 3 messages is always 0. The diagnostic command type is defined in the diagnostics message body. Codes for type 6 are TBD. |

For messages that are sent to or from an Access Port, the direction sub-field is set to 0 if the message is sent from the Access Port and set to 1 if the message is sent to the Access Port. Type 3 messages are used for hardware diagnostics and may be specified by the device manufacturer.

The type sub-field values and meanings are listed in Table 5.

TABLE 5

Type sub-field values.

| Type | Description |
|---|---|
| 0 | Management message. |
| 1 | Wireless Data message. |
| 2 | Flow Control message. |
| 3 | Diagnostic message. |
| 4 | Reserved |
| 5 | Reserved |
| 6 | Inter-Wireless Switch message. |
| 7 | Reserved |

The initial set of command codes for the management messages is set forth in Table 6. The initial set of command codes for the wireless data messages is set forth in Table 7. The initial set of command codes for the flow control messages is set forth in Table 8. The initial set of command codes for the diagnostic messages is set forth in Table 9.

TABLE 6

Type 0 message command code sub-field values.

| Direction | Command | Command Name | Usage |
|---|---|---|---|
| 1 | 0x0001 | Configuration | Runtime |
| 1 | 0x0002 | Reset | Runtime |
| 1 | 0x0003 | UpdateTim | Runtime |
|  | 0x0004 |  | undefined |
| 0 | 0x0005 | Ack-old | Download |
| 0 | 0x0006 | Status | Runtime |
| 1 | 0x0006 | Heartbeat | Runtime |
| 0 | 0x0007 | Hello | Download |
| 0 | 0x0008 | ConfigMe | Runtime |
| 0 | 0x0009 | LoadMe-old | Download |
| 0 | 0x000A | Nak-old | Download |
| 1 | 0x000B | LoadImage-old | Download |
| 1 | 0x000C | LoadDone-old | Download |
| 1 | 0x000D | Parent | Download |
| 0 | 0x000E | DeviceInfo | Runtime |
| 0/1 | 0x0015 | Ack | Download/Runtime |
| 0 | 0x0019 | LoadMe | Download |
| 0/1 | 0x001A | Nak | Download/Runtime |
| 1 | 0x001B | LoadImage | Download |
| 1 | 0x001C | LoadDone | Download |
|  | all other values |  | undefined |

TABLE 7

Type 1 command sub-field values.

| Direction | Combined Value | Command | Meaning |
|---|---|---|---|
| 0 | 0x1101 (from Access Port) | 0x0101 | Frame body contains 1 full packet |
| 1 | 0x9101 (to Access Port) | 0x0101 | Frame body contains 1 full packet |
| 0 | 0x1103 (from Access Port) | 0x0103 | Frame body contains 1st of 2 fragments of 1 data frame |
| 1 | 0x9103 (to Access Port) | 0x0103 | Frame body contains 1st of 2 fragments of 1 data frame |
| 0 | 0x1104 (from Access Port) | 0x0104 | Frame body contains 2nd of 2 fragments of 1 data packet |
| 1 | 0x9104 (to Access Port) | 0x0104 | Frame body contains 2nd of 2 fragments of 1 data packet |
|  | all other values |  | undefined |

TABLE 8

Type 2 command sub-field values.

| Direction | Combined Value | Command | Command Name |
|---|---|---|---|
| 0 | 0x2010 | 0x0010 | UpdateResults |
| 0 | 0x2011 | 0x0011 | DTIM_Poll |
|  | all other values |  | undefined |

TABLE 9

Type 3 command sub-field values.

| Direction | Combined Value | Command | Meaning |
|---|---|---|---|
| 0 | 0x3000 (from Access Port) | 0x3000 | Diagnostics Response from Access Port to Diagnostics Host |
| 1 | 0xB000 (to Access Port) | 0x3000 | Diagnostics Command to Access Port from Diagnostics Host |

The sequence field is used for multiple purposes. There are also multiple sequence number streams for use in different types of WISP messages. Each stream starts with a value of 0 and increments by one for each successive message.

The Wireless Switch assigns sequence numbers as follows: for a given Access Port, there is one 16-bit sequence number stream used for all Management messages sent by the Wireless Switch (the same stream is used regardless of whether the Management messages are addressed to the Access Port or one of the portals within the Access Port). In addition, there are different 16-bit sequence number streams used to send immediate Wireless Data messages to each portal within an Access Port. Immediate Wireless Data messages are those that are sent by the Wireless Switch to the portal without delay (this includes all directed data as well as those multicast data frames that match the multicast mask). Another sequence number "stream" is used by the Wireless Switch to send bulk-delayed Wireless Data messages to a portal. Bulk-delayed messages are those non-directed Data frames that are stored in the Wireless Switch until the portal requests them via a DTIM Poll message (i.e. all broadcasts plus those multicasts that don't match the multicast mask). Each time the Wireless Switch sends bulk-delayed messages, they start with sequence number 0 and increment by one until all queued messages are transmitted to the portal that requested them. In response to the next DTIM Poll, whether it comes from the same portal or a different one, the sequence numbers in the bulk-delayed Wireless Data messages start at 0 again.

The Access Port assigns sequence numbers as follows: the boot code utilizes a single 16-bit sequence number stream for all messages it transmits. After a successful download, the Access Port processor uses a different 16-bit sequence number stream for all messages it transmits (this currently only includes DeviceInfo messages). Each portal within the Access Port uses its own 16-bit sequence number stream for every message it transmits, regardless of whether they are Management, Wireless Data, or Flow Control messages.

An Access Port with two portals would deal with the following sequence number streams:
3 transmitted
    one for all messages sent by boot code
    one for all messages sent by portal 1
    one for all messages sent by portal 2

4 received
- one for all Management messages
- one for immediate Wireless Data messages to portal 1
- one for immediate Wireless Data messages to portal 2
- one for bulk-delayed Wireless Data messages to either portal During executable image downloading the sequence numbers provide a means of identifying each segment of the downloaded file by incrementing this value for each segment. This ensures that no frames are received out of sequence.

Sequence numbers are included in non-download management messages mainly to assist packet flow analysis and debug. Neither Wireless Switches nor portals are required to detect and/or reject non-download management messages that are received out of sequence.

During runtime the sequence numbers in immediate Wireless Data messages provide a means of flow control for 802.11 data frames sent from the Wireless Switch to a portal. The Wireless Switch and the portals use the Sequence field to reassemble any fragmented packets, as the sequence number will remain constant for each fragment of a Wireless Data message.

The following provides the details of Management message contents. Many of the messages follow a format that provides for the possibility of variable length fields. The general form of this format is:

| Item ID | Item Length | Data |
| --- | --- | --- |

Item IDs are unique single byte values.
Item Lengths represent the size of the Data field in bytes. Item Lengths may be fixed or variable.
Data is the actual data of interest.
Management frames are frames with type=0.

During Access Port initialization, the Hello message is transmitted once per second until a Parent reply is received or upon the expiration of a predetermined period of time (e.g., 60 seconds). The Hello message format is shown in Table 10, and is used with the Parent message to provide a way for Wireless Switches to declare their intention to adopt an Access Port. The Hello message has no body.

TABLE 10

Hello message format.

| Field | size in bytes | Byte offset from start of message | description |
| --- | --- | --- | --- |
| Destination | 6 | 0 | 0xFFFFFFFFFFFF (Broadcast address) |
| Source | 6 | 6 | Access Port NIC MAC address |
| Ethertype | 2 | 12 | 0x8783 |
| Command | 2 | 14 | 0x0007 |
| Sequence | 2 | 16 | 0-65535 |
| Length | 2 | 18 | 0 |

The Parent message is sent from a Wireless Switch to an Access Port in response to a Hello message. The Parent message is used with the Hello message to provide a way for Wireless Switches to declare their intention to adopt an Access Port.

A Wireless Switch sends a Parent message in response to a Hello message if the Wireless Switch is configured to do so.

The format for the Parent message is shown in Tables 11 and 12, the message body consists of the Wireless Switch MAC address.

TABLE 11

Parent message header.

| Field | size in bytes | Byte offset from start of message | description |
| --- | --- | --- | --- |
| Destination | 6 | 0 | Access Port NIC MAC address |
| Source | 6 | 6 | Wireless Switch MAC address |
| Ethertype | 2 | 12 | 0x8783 |
| Command | 2 | 14 | 0x800D |
| Sequence | 2 | 16 | 0-65535 |
| Length | 2 | 18 | 6 |

TABLE 12

Parent message body.

| Field | size in bytes | Byte offset from start of message body | description |
| --- | --- | --- | --- |
| Parent Address | 6 | 0 | Wireless Switch MAC address |

In response to the Parent message, the Access Port sends a LoadMe message. The message content and format depends on the configuration of the Access Port. A first version of the LoadMe message, shown in Table 13 is utilized by the DSP-based Access Ports of the type described in co-pending application Ser. No. 09/528,697 and shown in FIG. 2. Other Access Ports, particularly access ports having more than one portal utilize the LoadMe message defined in Table 15.

The LoadMe message is sent by an Access Port to request that an executable image be downloaded into the Access Port. When an Access Port powers on, it sends LoadMe messages at 1-second intervals for 10 seconds, if there is no response the Access port must reset.

Information in the LoadMe message body is used by the Wireless Switch to determine whether or not to adopt the Access Port. Information in the LoadMe message may also be presented to the user at the Wireless Switch user interface, depending on the design of the Wireless Switch.

The LoadMe frame body is made up of a series of Items. Each Item consists of a 1-byte ID field, a 1-byte length field, and a variable length data field. The length field is the total length in bytes of the data field. The length field is always an even number. If the true length of a variable length data field is an odd number, then a one byte pad (zero) is added to the end of the data to make the length an even number.

Item IDs 1 through 5, described in Table 14 below, must always be present in the LoadMe frame. This message may be extended when appropriate and other Items may be included as needed. The receiver of the LoadMe message must ignore all Items that it does not understand.

TABLE 13

First version LoadMe message header.

| Field | size in bytes | Byte offset from start of message | description |
| --- | --- | --- | --- |
| Destination | 6 | 0 | 0xFFFFFFFFEFFF (Multicast address) |

TABLE 13-continued

First version LoadMe message header.

| Field | size in bytes | Byte offset from start of message | description |
|---|---|---|---|
| Source | 6 | 6 | Access Port NIC MAC address |
| Ethertype | 2 | 12 | 0x8783 |
| Command | 2 | 14 | 0x0009 |
| Sequence | 2 | 16 | 0-65535 |
| Length | 2 | 18 | Length of entire message (= 76) |

TABLE 14

First version LoadMe message body.

| Field | size in bytes | Byte offset from start of message body | Description |
|---|---|---|---|
| Reserved | 6 | 0 | Unused |
| Frag Len | 2 | 6 | Length of all data to follow (= 48) |
| ID 0x01 | 2 + 6 | 8 | Access Port NIC MAC address |
| ID 0x02 | 2 + 12 | 16 | Access Port Serial number in binary or ascii |
| ID 0x03 | 2 + 2 | 30 | Access Port PCB revision number in binary. First byte = major. Second byte = minor. |
| ID 0x04 | 2 + 2 | 34 | Access Port Boot Loader revision number in binary. First byte = major. Second byte = minor. |
| ID 0x05 | 2 + 16 | 38 | Access Port model number in ascii. |

A second version of the LoadMe message, for use by advanced Access Ports, such as the multiple portal access ports shown in FIGS. 3 and 4, is shown in Tables 15 and 16.

TABLE 15

Second version LoadMe message header.

| Field | size in bytes | Byte offset from start of message | description |
|---|---|---|---|
| Destination | 6 | 0 | 0xFFFFFFFFFFFF (Broadcast address) |
| Source | 6 | 6 | Access Port NIC MAC address |
| Ethertype | 2 | 12 | 0x8783 |
| Command | 2 | 14 | 0x0019 |
| Sequence | 2 | 16 | 0-65535 |
| Length | 2 | 18 | Variable (see Table 16) |

TABLE 16

Second version LoadMe message body.

| Item ID | Length of data field in bytes | Description |
|---|---|---|
| 0x01 | 6 | Access Port NIC MAC address |
| 0x02 | variable | Access Port Serial number in binary or ascii. |

TABLE 16-continued

Second version LoadMe message body.

| Item ID | Length of data field in bytes | Description |
|---|---|---|
| 0x03 | 2 | Access Port PCB revision number in binary. First byte = major. Second byte = minor. |

The Wireless Switch responds to the LoadMe message with a LoadImage message, which downloads the operating code for the network interface card (NIC) of the access port. For the first version of the LoadMe message the LoadImage message is described in Table 17 and 18.

The Wireless Switch sends the first LoadImage in response to a LoadMe (if the Wireless Switch determines that it will adopt this Access Port).

When the Access Port responds to the LoadImage with a Ack that indicates the next sequence number, the Wireless Switch sends the next LoadImage message. When the Access Port responds to the LoadImage with a Nak, the Wireless Switch resends the last LoadImage message.

This continues until the entire image has been downloaded.

The last portion of the file is sent in the body of a LoadDone message. This indicates to the Access Port that it has received its entire runtime image.

TABLE 17

First version LoadImage message header.

| Field | size in bytes | Byte offset from start of message | description |
|---|---|---|---|
| Destination | 6 | 0 | Access Port NIC MAC address |
| Source | 6 | 6 | Wireless Switch MAC address |
| Ethertype | 2 | 12 | 0x8783 |
| Command | 2 | 14 | 0x800B |
| Sequence | 2 | 16 | 0-65535 |
| Length | 2 | 18 | Length of entire message (= 28 + R) |

TABLE 18

First version LoadImage message body.

| Field | size in bytes | Byte offset from start of message body | description |
|---|---|---|---|
| Reserved | 6 | 0 | Unused |
| Frag Len | 2 | 6 | Length of all data to follow (= R) |
| Runtime Image | R | 8 | Block of runtime image |

In response to the second version of the Load Me message the Wireless switch sends the LoadImage message in the format specified in Tables 19 and 20. As with the first version, the image code may be sent in a number of fragments with the last fragment indicated to be a LoadDone message in the command code.

TABLE 19

LoadImage message header.

| Field | size in bytes | Byte offset from start of message | description |
|---|---|---|---|
| Destination | 6 | 0 | Access Port NIC MAC address |
| Source | 6 | 6 | Wireless Switch MAC address |
| Ethertype | 2 | 12 | 0x8783 |
| Command | 2 | 14 | 0x801B |
| Sequence | 2 | 16 | 0-65535 |
| Length | 2 | 18 | R (see FIG. 20) |

TABLE 20

LoadImage message body.

| Field | size in bytes | Byte offset from start of message body | description |
|---|---|---|---|
| Runtime Image | R | 0 | Block of runtime image |

Acknowledgement messages are sent by the access port in response to each LoadImage or LoadDone message from the wireless switch to the access port that is successfully received. The first version Ack message is responsive to the first versions of the LoadImage and LoadDone messages and is set forth in Tables 21 and 22. The second version responsive to the second version of the LoadImage and LoadDone messages is set forth in Tables 23 and 24. The sequence number in the Ack is taken from the sequence field of the LoadImage or LoadDone packet header.

TABLE 21

First version Ack message header (Ack from Access Port to Wireless Switch).

| Field | size in bytes | Byte offset from start of message | description |
|---|---|---|---|
| Destination | 6 | 0 | Wireless Switch MAC address |
| Source | 6 | 6 | Access Port NIC MAC address |
| Ethertype | 2 | 12 | 0x8783 |
| Command | 2 | 14 | 0x0005 |
| Sequence | 2 | 16 | 0-65535 |
| Length | 2 | 18 | Length of entire message (= 30) |

FIG. 22

Ack message body (Ack from Access Port to Wireless Switch).

| Field | size in bytes | Byte offset from start of message body | Description |
|---|---|---|---|
| Reserved | 6 | 0 | Unused |
| Frag Len | 2 | 2 | Length of all data to follow (= 2) |
| Download Sequence Number | 2 | 8 | Identical to the value of the Sequence field in the header of the received LoadImage or LoadDone message |

TABLE 23

Second version Ack message header (Ack from Access Port to Wireless Switch).

| Field | size in bytes | Byte offset from start of message | description |
|---|---|---|---|
| Destination | 6 | 0 | Wireless Switch MAC address |
| Source | 6 | 6 | Access Port NIC MAC address |
| Ethertype | 2 | 12 | 0x8783 |
| Command | 2 | 14 | 0x0015 |
| Sequence | 2 | 16 | 0-65535 |
| Length | 2 | 18 | 2 |

TABLE 24

Second versionAck message body (Ack from Access Port to Wireless Switch).

| Field | size in bytes | Byte offset from start of message body | description |
|---|---|---|---|
| Download Sequence Number | 2 | 0 | Identical to the value of the Sequence field in the header of the received LoadImage or LoadDone message |

A Wireless Switch using the second version sends an Ack when a DeviceInfo packet is successfully processed. The sequence number in the Ack is taken from the sequence field of the DeviceInfo packet header. The format for the Ack message from the Wireless Switch to the Access Port is set forth in Tables 25 and 26.

TABLE 25

Ack message header (Ack from Wireless Switch to Access Port).

| Field | size in bytes | Byte offset from start of message | description |
|---|---|---|---|
| Destination | 6 | 0 | Access Port NIC MAC address |
| Source | 6 | 6 | Wireless Switch MAC address |
| Ethertype | 2 | 12 | 0x8783 |
| Command | 2 | 14 | 0x8015 |
| Sequence | 2 | 16 | 0-65535 |
| Length | 2 | 18 | 2 |

TABLE 26

Ack message body (Ack from Wireless Switch to Access Port).

| Field | size in bytes | Byte offset from start of message body | description |
|---|---|---|---|
| DeviceInfo Sequence Number | 2 | 0 | Identical to the value of the Sequence field in the header of the received DeviceInfo message |

Nak messages are sent under the same conditions as Ack messages when a prior message is not successfully received. The first version Nak message format is set forth in Tables 27 and 28. The second version Nak messages from the Access Port to the Wireless Switch are set forth in Tables 29 and 30. The Nak messages from the Wireless switch to the Access Port are set forth in Tables 31 and 32. In connection with Nak messages the sequence number is taken as the last successful sequence field incremented by one.

TABLE 27

First version Nak message header (Nak from Access Port to Wireless Switch).

| Field | size in bytes | Byte offset from start of message | description |
|---|---|---|---|
| Destination | 6 | 0 | Wireless Switch MAC address |
| Source | 6 | 6 | Access Port NIC MAC address |
| Ethertype | 2 | 12 | 0x8783 |
| Command | 2 | 14 | 0x000A |
| Sequence | 2 | 16 | 0-65535 |
| Length | 2 | 18 | Length of entire message (= 30) |

TABLE 28

First version Nak message body (Nak from Access Port to Wireless Switch).

| Field | size in bytes | Byte offset from start of message body | description |
|---|---|---|---|
| Reserved | 6 | 0 | Unused |
| Frag Len | 2 | 2 | Length of all data to follow (= 2) |
| Download Sequence Number | 2 | 8 | Equal to the value of the Sequence field in the header of the received LoadImage or LoadDone message plus 1 |

TABLE 29

Second version Nak message header (Nak from Access Port to Wireless Switch).

| Field | size in bytes | Byte offset from start of message | description |
|---|---|---|---|
| Destination | 6 | 0 | Wireless Switch MAC address |
| Source | 6 | 6 | Access Port NIC MAC address |
| Ethertype | 2 | 12 | 0x8783 |
| Command | 2 | 14 | 0x001A |
| Sequence | 2 | 16 | 0-65535 |
| Length | 2 | 18 | 2 |

TABLE 30

Second version Nak message body (Nak from Access Port to Wireless Switch).

| Field | size in bytes | Byte offset from start of message body | description |
|---|---|---|---|
| Download Sequence Number | 2 | 0 | Equal to the value of the Sequence field in the header of the received LoadImage or LoadDone message plus 1 |

TABLE 31

Second version Nak message header (Nak from Wireless Switch to Access Port).

| Field | size in bytes | Byte offset from start of message | description |
|---|---|---|---|
| Destination | 6 | 0 | Access Port NIC MAC address |
| Source | 6 | 6 | Wireless Switch MAC address |
| Ethertype | 2 | 12 | 0x8783 |
| Command | 2 | 14 | 0x801A |
| Sequence | 2 | 16 | 0-65535 |
| Length | 2 | 18 | 2 |

TABLE 32

Second version Nak message body (Nak from Wireless Switch to Access Port).

| field | size in bytes | Byte offset from start of message body | description |
|---|---|---|---|
| DeviceInfo Sequence Number | 2 | 0 | Equal to the value of the Sequence field in the header of the received DeviceInfo message plus one |

A LoadDone message is sent by the Wireless Switch to the Access Port with the last fragment of code of the LoadImage message. In connection with Access Ports using the first version the LoadDone message is defined by Tables 33 and 34. The second version of the LoadDone message is shown in Tables 35 and 36. The LoadDone message contains the last segment of image code followed by a 16-bit checksum.

TABLE 33

First version LoadDone message header.

| Field | size in bytes | Byte offset from start of message | description |
| --- | --- | --- | --- |
| Destination | 6 | 0 | Access Port NIC MAC address |
| Source | 6 | 6 | Wireless Switch MAC address |
| Ethertype | 2 | 12 | 0x8783 |
| Command | 2 | 14 | 0x800C |
| Sequence | 2 | 16 | 0-65535 |
| Length | 2 | 18 | Length of entire message (= 30 + R) |

TABLE 34

First version LoadDone message body. The number of bytes remaining may be zero.

| field | size in bytes | Byte offset from start of message body | description |
| --- | --- | --- | --- |
| Reserved | 6 | 0 | Unused |
| Frag Len | 2 | 2 | Length of all data to follow (= 2) |
| Runtime Image | R | 8 | Last block of runtime image. |
| Checksum | 2 | R | 16-bit, 'exclusive or' checksum of the entire downloaded image file. Big endian. If the total number of bytes in the image is odd, a zero 'pad' byte is added to perform the checksum calculation. |

TABLE 35

Second version LoadDone message header.

| Field | size in bytes | Byte offset from start of message | description |
| --- | --- | --- | --- |
| Destination | 6 | 0 | Access Port NIC MAC address |
| Source | 6 | 6 | Wireless Switch MAC address |
| Ethertype | 2 | 12 | 0x8783 |
| Command | 2 | 14 | 0x801C |
| Sequence | 2 | 16 | 0-65535 |
| Length | 2 | 18 | R + 2 (see FIG. 3.12a) |

TABLE 36

Second version LoadDone message body. The number of bytes remaining may be zero.

| field | size in bytes | Byte offset from start of message body | description |
| --- | --- | --- | --- |
| Runtime Image | R | 0 | Last block of runtime image. |
| Checksum | 2 | R | 16-bit, 'exclusive or' checksum of the entire downloaded image file. Big endian. If the total number of bytes in the image is odd, a zero 'pad' byte is added to perform the checksum calculation. |

An Access Port using the second version sends a DeviceInfo packet to report the combined capabilities of all its portals to the Wireless Switch. The DeviceInfo message is sent when the Access Port's runtime image is loaded and is executing correctly, but before its radios have been configured. The DeviceInfo message is broadcast so that all Wireless Switches may be aware of the Access Port's radio configuration.

If the Access Port received a Parent response from its Hello message, the Access Port expects an Ack of the DeviceInfo message from its Parent Wireless switch (i.e. from the MAC address indicated by the first Parent to reply to the Access Port's Hello message). If the Access Port does not see such an ACK within 10 seconds, it will reset and begin sending Hello messages.

If the Access Port did not receive a Parent response from its Hello message, the Access Port will send five DeviceInfo messages (once per second). It will then reset and begin sending Hello messages.

The Body of the DeviceInfo message is made up of a series of items. These items are not guaranteed to be in any particular order, although it is suggested that they be placed in numerical order according to the value of their ID fields.

The format for the DeviceInfo message is set forth in Tables 37 through 40.

TABLE 37

DeviceInfo message header.

| Field | size in bytes | Byte offset from start of message | description |
| --- | --- | --- | --- |
| Destination | 6 | 0 | 0xFFFFFFFFFFFF (Broadcast address) |
| Source | 6 | 6 | Access Port NIC MAC address |
| Ethertype | 2 | 12 | 0x8783 |
| Command | 2 | 14 | 0x000E |
| Sequence | 2 | 16 | 0-65535 |
| Length | 2 | 18 | Variable (see FIG. 38) |

TABLE 38

DeviceInfo Message Body.

| item ID | length of data field in bytes | Description |
| --- | --- | --- |
| 0x01 | 6 | Access Port NIC MAC address. |
| 0x02 | variable | Access Port serial number in ascii. |
| 0x03 | 2 | Access Port PCB revision number in binary. First byte = major. Second byte = minor. |

TABLE 38-continued

DeviceInfo Message Body.

| item ID | length of data field in bytes | Description |
|---|---|---|
| 0x05 | variable | Access Port model number in ascii. |
| 0x06 | Variable | WISP version in ascii |
| 0x07 | 6 | Parent. The MAC address of the first Wireless Switch to respond to the Access Port's Hello frame. All 0's if no Wireless Switch replied to the Hello frame. |
| 0x08 | Variable | Access Port runtime firmware version number in ascii. |
| 0x09 | 2 | Number of installed portals (radios). |
| 0x0A | 2 | Portal index (0 based). |
| 0x0B | 2 | Portal type (see FIG. 3.13b). |
| 0x0C | variable | Portal firmware revision number in ascii. |
| 0x0D | 2 | Options bit mask (see FIG. 3.13c). |
| 0x0E | 6 | Portal MAC address |
| 0x58 | 1 | Number of supported ESSs |

Items Oxa, Oxb, Oxc, Oxd, and Oxe above may preferably be repeated (in order) for each portal on the device.

TABLE 39

Portal Type Codes.

| Portal Type | description |
|---|---|
| 0 | IEEE 802.11a radio. |
| 1 | IEEE 802.11b DS radio. |
| 2 | IEEE 802.11g radio. |
| 3 | IEEE 802.11b FH radio. |

TABLE 40

Option Bit Mask Definitions.

| Bit number | description |
|---|---|
| 15 | Internal primary antenna installed. |
| 14 | External primary antenna installed. |
| 13 | Internal secondary antenna installed. |
| 12 | External secondary antenna installed. |

It is notable that the bits of Table 40 may have meaning only if the Access Port has the capability to detect the presence of the antenna. Thus, the Wireless Switch must preferably be aware of the Access Port's capability to detect antennas.

When the Access Port's runtime image is loaded following the second version of the protocol and the Access Port has successfully sent a DeviceInfo to the Wireless Switch, but the radio has not been configured, each portal of the Access Port sends the ConfigMe packet to report its capabilities to the Wireless Switch and to request its configuration. Until a radio has been configured, it sends a ConfigMe packet every 3 seconds for 9 seconds. After which it sends out a ConfigMe every 60 seconds until a response if received. When the Configuration Packet has been successfully received and processed by the radio, the ConfigMe is no longer sent. The radio then begins normal operation. The format of the ConfigMe message is set forth in Tables 41 and 42.

TABLE 41

ConfigMe message header.

| Field | size in bytes | Byte offset from start of message | description |
|---|---|---|---|
| Destination | 6 | 0 | Wireless Switch MAC address |
| Source | 6 | 6 | Radio MAC address |
| Ethertype | 2 | 12 | 0x8783 |
| Command | 2 | 14 | 0x0008 |
| Sequence | 2 | 16 | 0-65535 |
| Length | 2 | 18 | Variable (see Table 42) |

TABLE 42

ConfigMe message body.

| item ID | length of data field in bytes | Description |
|---|---|---|
| 0x01 | 6 | Access Port NIC MAC address. |
| 0x07 | 6 | Parent. The MAC address of the first Wireless Switch to respond to the Access Port's Hello frame. |
| 0x0A | 2 | Portal index (0 based). |
| 0x0B | 2 | Portal type (see Table 39). |
| 0x0C | variable | Portal firmware revision number in ascii. |
| 0x0D | 2 | Options bit mask (see Table 40). |
| 0x0E | 6 | Portal MAC address. |
| 0x0F | 2 | Total number of buffers available to hold packets awaiting forwarding (transmission, if the Portal is a radio). |
| 0x10 | 2 | Transmit buffer size in bytes |
| 0x11 | 1 | Hop Set (FH port value) |
| 0x12 | 1 | Hop Sequence (FH port current value) |
| 0x13 | 2 | Hop dwell Time (FH port current value |

It is noted that the FH portal will preferably send out certain parameters already stored in FLASH configuration memory. Exemplary values are set forth in Table 42 and are Hop Set (values may be 1-3), Hop sequence (values may be 1-max number of channels/3), and hop dwell time (range 20-1000 in K-usec units).

The Wireless Switch may send a Configuration packet in response to the ConfigMe packet or whenever a change in configuration is required.

The Configuration message includes a header shown in Table 43 and is made up of a variable number of Items. The format of the possible Configuration Items is described in Tables 44 to 51. A Portal must ignore any configuration item that it does not recognize.

Configuration messages will generate a Status message if they are processed correctly. If the Access Port determines that the Configuration is erroneous, the Access Port shall reply to the Configuration with a Status message that indicates the error in the Configuration Error Type field.

TABLE 43

Configuration message header.

| Field | size in bytes | Byte offset from start of message | description |
|---|---|---|---|
| Destination | 6 | 0 | Radio MAC address |
| Source | 6 | 6 | Wireless Switch MAC address |
| Ethertype | 2 | 12 | 0x8783 |
| Command | 2 | 14 | 0x8001 |
| Sequence | 2 | 16 | 0-65535 |
| Length | 2 | 18 | Variable (see Table 44) |

TABLE 44

Configuration Message Body Item Descriptions.

| Item ID | Length of data field in bytes | description |
|---|---|---|
| 0x20 | 2 | Configuration sequence number. Incremented for each succeeding Configuration messages sent to a particular radio. |
| 0x21 | variable | ESS ID. First byte is ESS index, followed by ESS ID in ascii. |
| 0x22 | 1 | Index of ESS to use in beacons. |
| 0x23 | 2 | ESS ID activation mask. Bit 0 = ESS 0, etc. If the bit is set, that ESS is active, otherwise it is not active. When an Access Port receives a Probe for an active ESS, the Access Port will generate a Probe Response. When an Access Port receives a Probe for an inactive ESS, the Access Port will not generate a Probe Response. |
| 0x24 | 1 | Transmit power level. Units in dbm. |
| 0x25 | 1 | Primary channel number. IEEE 802.11b channels are 1 through 14. IEEE 802.11a channels are 36, 40, 44, 48, 52, 56, 60, 64, 149, 153, 157, 161. |
| 0x27 | 2 | Allowed rates mask. (See Table 67 for rate mapping.) |
| 0x28 | 2 | Basic rates mask. (See Table 67 for rate mapping.) NOTE: For the Atheros 11a radio there are only two possibilities for Basic Rates: 6 and {6, 12, 24}. For the FH radio possibilities for Basic Rates are 1 only, 2 only, or 1 & 2. |
| 0x29 | 1 | CCA level. |
| 0x2A | 1 | CCA mode (algorithm 1, 2, 3, or 4). |
| 0x2B | 2 | RTS threshold (0-2437). A zero value causes an RTS frame to precede every MSDU. |
| 0x2C | 2 | ESS Options. First byte is ESS index. Second byte is a capability mask. See FIG. 3.15b. |
| 0x2D | 2 | Broadcast ESS enable mask. Bit 0 = ESS 0, etc. If a bit for a specific ESS is set, the radio will respond to probes using a broadcast ESS with a probe response. |
| 0x2E | 2 | Option mask. See Table 45 for option definitions. |
| 0x2F | variable | Allowed channels (one byte each). This is the list of channels that will be scanned during an Auto Channel Scan procedure. Channels in this list will be binary numbers as listed below. The selected channel will be returned to the Wireless Switch in a Status message. IEEE 802.11b channels are 1 through 14. IEEE 802.11a channels are 36, 40, 44, 48, 52, 56, 60, 64, 149, 153, 157, 161. |
| 0x30 | 1 | Time (in seconds) to scan any channel for the presence of radar before using. |
| 0x31 | 2 | Time (in TU or kilo microseconds) of quiet period if Bluetooth coexistence is enabled. |
| 0x32 | 1 | Time (in 64 microsecond pieces) of guard band if Bluetooth coexistence is enabled. |
| 0x33 | 2 | Beacon interval in TU (kilo microseconds). |
| 0x34 | 1 | DTIM interval, measured in beacon intervals. |
| 0x35 | variable | Reserved for IEEE 802.11i security element. |
| 0x36 | variable | Country information element. See Tables 47 and 48 |
| 0x37 | 17 | Load balance element. See Table 49. |
| 0x38 | variable | WiFi Protected Access (WPA) Element. First byte is ESS index. Following bytes are WPA security element. See Table 50. |
| 0x39 | 1 | Hop Algorithm (0 - IEEE, 1 - Hop Delta) |
| 0x42 | 1 | Hop Set (1, 2, or 3) |
| 0x43 | 1 | Hop Sequence (index into hop table possible values are 1 through max # of channels/3) |
| 0x44 | 2 | Hop Dwell Time (Kilo microseconds) |
| 0x45 | Variable | Hop channel table |

Note: For the FH port the Country information element could be used to set up First channel and Max Channel for the Hop Table. Therefore First Hop Channel and Maximum number of channels where not inserted to Configuration message body.

TABLE 45

ESS Options Item Bit Definitions.

| bytes | description |
|---|---|
| 1 | ESS index (0-3). |
| 1 | Bit mask. Bit 0 = WEP enabled. |

TABLE 46

Option Mask Bit Definitions.

| bit | description |
| --- | --- |
| 0 | Secure beacon - if set, the ESS is not transmitted in the beacon. |
| 1 | Automatic channel scan - enabled if bit is set. |
| 2 | Short preamble - enabled if bit is set. |
| 3 | Rogue AP detection - enabled if bit is set. |
| 4-7 | Antenna diversity settings. See Table 51 for definitions |
| 8 | Scan channels for radar before using. |

TABLE 47

Country Information Element header.

| field | bytes | description |
| --- | --- | --- |
| m_byElementId | 1 | ELEMENT_ID_COUNTRY_INFO = 7 |
| m_byLength | 1 | Variable - see below. |
| m_CountryCode | 2 | Country ID padded with trailing spaces |
| m_indoor_outdoor | 1 | Indoor vs Outdoor setting |

TABLE 48

Country Information Element channel descriptor.

| field | bytes | description |
| --- | --- | --- |
| m_byMinChannel | 1 | first channel for country |
| m_byMaxChannel | 1 | number of channels |
| m_byMisc | 1 | maximum tx power in dBm (signed) |

Note that the number of the above channel descriptors is variable for each country (for each Country Information Element header). Each country has as many of the above three-byte channel descriptors as there are non-contiguous bands - or have different power levels within a contiguous group of channels. For 802.11a, contiguous means "monotonically increasing". Thus, for example, the entire U-NII lower band (with a maximum of 10 dBm power) could be specified as:
m_byMinChannel = 36
m_byMaxChannel = 4
m_byMisc = 10
The above values for the channel descriptor would indicate that channels 36, 40, 44, and 48 are allowed.
For 802.11a all channels monotonically increase by four. For 802.11b all channels monotonically increase by one.

TABLE 49

Load Balance Element.

| field | bytes | description |
| --- | --- | --- |
| m_byElementId | 1 | ELEMENT_ID_LOAD_INFO = 173 |
| m_byLength | 1 | length is fixed at 15 |
| m_byOUI | 3 | 0x00a0f8 (Symbol) |
| m_woAssociatedMUs | 2 | total associated MUs |
| m_woKBPS | 2 | kilo bytes per second |
| m_woPacketsPS | 2 | packets per second |
| m_woTXPower | 2 | transmit power |
| m_dwNetTime | 4 | network time |

TABLE 50

WiFi Protected Access (WPA) Element.

| field | bytes | description |
| --- | --- | --- |
| ESS index. | 2 | Index of ESS being referred to. |
| ID | 1 | 221 decimal or 0xDD |
| length | 1 | variable |
| OUI | 3 | 0x00, 0x50, 0xF2 |
| OUI Type | 1 | 0x01 |
| version | 2 | TBD |
| MC Suite | 4 | Multicast suite selector. (For selector details, see SSN documentation.) |
| UC Suite count | 2 | Number of unicast suite selectors. |
| UC Suite list | 4*N | Unicast suite selectors. |
| Auth Suite count. | 2 | Number of authentication suites. |
| Auth Suite list | 4*N | Authentication suite selectors. |

TABLE 51

Antenna Diversity Settings.

| bit | description |
| --- | --- |
| 4 | Receive on Primary Antenna |
| 5 | Receive on Secondary Antenna. |
| 6 | Transmit on Primary Antenna |
| 7 | Transmit on Secondary Antenna |

The configuration sequence number is incremented by the Radio when all configuration processing is complete. The radio sends this value to the Wireless Switch in a Status packet to indicate that all changes specified have been successfully made. If the radio receives a Configuration packet with the previously seen sequence number the radio will ignore that packet.

The initial Configuration packet sent to a radio must contain all of the configuration information that is required for radio operation. If a field is absent, the radio will use a default value. Subsequent Configuration packets must contain Items that are to be changed, but may contain Items that have not changed.

Every 5 seconds, a configured Radio sends a Status message to the Wireless Switch to announce that it is still operational. Additional Status packets can be sent at any time as needed so that the Wireless Switch may recognize significant changes. Examples of significant changes are the auto channel scan feature completes, an 802.11a portal detects radar on its current channel, or an erroneous Configuration message is received as indicated by the Configuration Error Type field. When this occurs, the Configuration message that contained the error, is not effective.

The Status packet is also used to send statistical and status information to the Wireless Switch. These Items can be defined in the future.

The body of this message consists of a series of Items. Each Item consists of a 1-byte Item ID, a 1-byte length, and a variable length data field. The length field is the total length in bytes of the data field. The Status message format is shown in Tables 52, 53 and 54.

TABLE 52

Status message header.

| Field | size in bytes | Byte offset from start of message | description |
|---|---|---|---|
| Destination | 6 | 0 | Wireless Switch MAC address |
| Source | 6 | 6 | Radio MAC address |
| Ethertype | 2 | 12 | 0x8783 |
| Command | 2 | 14 | 0x0006 |
| Sequence | 2 | 16 | 0-65535 |
| Length | 2 | 18 | Variable (see Table 53) |

TABLE 53

Status Message Body.

| item ID | bytes | meaning | description |
|---|---|---|---|
| 0x50 | 2 | Auto channel scan. | 0xFFFF => ACS in process 0xFFFE => ACS complete; new configuration pending. Else => Current channel |
| 0x51 | 2 | Configuration complete. | Configuration sequence number of active configuration |
| 0x52 | 4 | Cumulative CRC Errors | Number of CRC errors since last reset (if available) |
| 0x53 | 1 | Radar Detect | The existence of this field means that radar was detected. The one-byte data field indicates the channel on which the radar was detected. |
| 0x54 | 2 | Configuration Error Type | 0 means no errors. Non zero indicates an error number. See Table 54 for a list of error numbers. |
| 0x59 | 1 | Seconds since last heartbeat | The number of seconds since the last heartbeat message was received by the Access Port |

During normal operation, the selected channel item is the channel currently in use by the radio. The value 0xffff indicates that Auto Channel Scan is in progress. The value 0xfffe indicates that Auto Channel Scan has completed and the radio is waiting for a new configuration.

TABLE 54

Error numbers.

| error number | meaning |
|---|---|
| 0x01 | ACS bit set. No channels indicated. |
| 0x02 | Channels inconsistent with Country Information Element |

The Wireless Switch sends a Heartbeat message to each Radio each second to indicate to the Radio that the Wireless Switch is still operational, to keep the network time synchronized and to update load balance data This load balance data becomes part of the Load Balance Element in the beacon and probe response RF packet. The requirement for the 1-second update time is to keep the network time synchronized. The Heartbeat message format is shown in Tables 55 and 56.

TABLE 55

Heartbeat message header.

| Field | size in bytes | Byte offset from start of message | description |
|---|---|---|---|
| Destination | 6 | 0 | Radio MAC address |
| Source | 6 | 6 | Wireless Switch MAC address |
| Ethertype | 2 | 12 | 0x8783 |
| Command | 2 | 14 | 0x8006 |
| Sequence | 2 | 16 | 0-65535 |
| Length | 2 | 18 | 19 |

TABLE 56

Heartbeat Message Body.

| item ID | bytes | description |
|---|---|---|
| 0x37 | 17 | Load balance element. See Table 49. |

The purpose of UpdateTIM packet is to update the Partial Virtual Bitmap field of the beacon for a Radio and to update the bitmap offset of the bitmap control field. The rest of the fields in TIM element are filled in by the Radio.

The TIM map is compiled by the Wireless Switch based on the traffic currently stored for each PSP MU that is associated through this radio (if any). The length field of the fragment control header indicates the total length of the element.

Format for the UpdateTIM message is shown in Tables 57 and 58. The first byte of the body in the packet will indicate the bitmap offset for bitmap control. The rest is the Partial Virtual Bitmap to be part of each beacon.

TABLE 57

UpdateTIM message header.

| Field | size in bytes | Byte offset from start of message | description |
|---|---|---|---|
| Destination | 6 | 0 | Radio MAC address |
| Source | 6 | 6 | Wireless Switch MAC address |
| Ethertype | 2 | 12 | 0x8783 |
| Command | 2 | 14 | 0x8003 |
| Sequence | 2 | 16 | 0-65535 |
| Length | 2 | 18 | Variable (see Table 58) |

TABLE 58

UpdateTIM Message Body.

| field | size in bytes | Byte offset from start of message body | description |
|---|---|---|---|
| BSS Index | 2 | 0 | Index of BSSID that is requesting its bulk-delayed Wireless Data messages. Valid range = 0-3 (4 BSSIDs supported) |
| Bitmap Offset | 1 | 2 | Bitmap offset to be included in the TIM information element, as defined by 802.11 |
| Partial Virtual Bitmap | variable | 3 | Partial virtual bitmap to be included in the TIM information element, as defined by 802.11 |

The purpose of Reset packet is to reset the Access Port. It may be directed to either the Access Port NIC MAC address or to a Portal MAC address. When directed to the Access Port NIC MAC address, the Reset packet has the same effect as toggling power at the Access Port—the Access Port will revert back to its initialization procedure.

When directed to a Portal MAC address, the Portal will revert to the ConfigMe stage, sending ConfigMe messages until a Configuration is received from the Portal's Parent Wireless Switch. Portals other the destination portal shall not change their operating state. The header for the Reset message is shown in Table 59. This message has no body.

TABLE 59

Reset message header.

| Field | size in bytes | Byte offset from start of message | description |
|---|---|---|---|
| Destination | 6 | 0 | Access Port NIC MAC address OR Portal MAC address |
| Source | 6 | 6 | Wireless Switch MAC address |
| Ethertype | 2 | 12 | 0x8783 |
| Command | 2 | 14 | 0x8002 |
| Sequence | 2 | 16 | 0-65535 |
| Length | 2 | 18 | 0 |

In the following discussion the term "radio" is used to refer to a Portal (radio or other entity) that resides within an Access Port, even in the case where the Access Port only consists of one radio and the same MAC address is used for both Access Port and radio.

Each message to be sent to a radio by a Wireless Switch is sent encapsulated in one or more Wireless Data Packets. Each time the Wireless Switch creates a Wireless Data Packet—without fragments—in which to encapsulate a message, it increments the value of the sequence field in that Wireless Data Packet by 1. If the message must be fragmented, the sequence number is the same value for each fragment of the message. The radio remembers the value of the sequence field in the last of the Wireless Data Packets that contained each frame to be transmitted. The sequence numbering is independent for each radio within an Access Port. As soon as possible after the radio forwards a frame that it received from a Wireless Switch, it reports the value of the sequence field that was in the Wireless Data Packet that originally contained that frame back to the Wireless Switch in the Results1 or Results2 fields as described below.

There are two methods that a radio can use to report to the Wireless Switch the sequence fields of frames most recently forwarded. Both methods involve filling in the Tx Results fields of a message that is sent to the Wireless Switch. The first method is to fill in the Tx Results1 and Tx Results2 fields in a Wireless Data Packet that contains a message received by the radio and destined for the Wireless Switch. The second method is to create an UpdateResults message, fill in one or more Tx Results fields as necessary, and send it to the Wireless Switch. The only purpose of this message is to report the results fields to the Wireless Switch. Each radio must implement a mechanism to report the results of forwarded messages to the Wireless Switch as quickly as possible.

When a fragmented message received by the Access Port from the Wireless Switch has been successfully transmitted by the Access Port, the successful result is indicated as described above. In this case, just one Results indication is sent from the Access Port to the Wireless switch—even though the Access Port received two frames (two fragments) for the message.

The format for a wireless data message from the access port to the wireless switch is set forth in Table 60 and 61. When the access port is configured using the first version of the protocol and having only one access port, the Radio MAC address is the address of the Access Port NIC.

TABLE 60

Wireless Data message header (Data from Radio to Wireless Switch)

| Field | size in bytes | Byte offset from start of message | description |
|---|---|---|---|
| Destination | 6 | 0 | Wireless Switch MAC address |
| Source | 6 | 6 | Radio MAC address |
| Ethertype | 2 | 12 | 0x8783 |
| Command | 2 | 14 | 0x1101 (if frame body contains a complete packet) 0x1103 (if frame body contains $1^{st}$ of 2 fragments) 0x1104 (if frame body contains $2^{nd}$ of 2 fragments) |
| Sequence | 2 | 16 | 0-65535 NOTE: The Sequence value shall be constant for a given pair of Wireless Data messages of Command types 0x1103 and 0x1104 (i.e. fragments share a single sequence number) |
| Length | 2 | 18 | D + 14 (see Table 61) |

TABLE 61

Wireless Data message body (Data from portal to Wireless Switch)

| field | size in bytes | Byte offset from start of message body | Description |
|---|---|---|---|
| Flow Control Window | 2 | 0 | Future sequence number corresponding to the last immediate Wireless Data message that can be received, given the currently available buffers in the portal |
| Tx Results 1 | 4 | 2 | Allows results of a completed frame transmission to be piggybacked onto a received frame (see Table 62 for details) |
| Tx Results 2 | 4 | 6 | Allows results of a $2^{nd}$ completed frame transmission to be piggybacked onto a received frame (see Table 62 for details) |
| Rx Data | 2 | 10 | Information about the received frame (see Table 63 for details) |

TABLE 61-continued

Wireless Data message body (Data from portal to Wireless Switch)

| field | size in bytes | Byte offset from start of message body | Description |
|---|---|---|---|
| Channel | 2 | 12 | Channel on which the data frame was received (see Table 65 for details) |
| Data Frame | D | 14 | 802.11 data frame received by the portal |

The format for the TxResults 1 and TxResults 2 fields is set forth in Table 62.

FIG. 62 Format of the Tx Results1 and Tx Results2 fields

| field | length (bits) | bit # | Description |
|---|---|---|---|
| ok | 2 | 31-30 | 0 = tx results invalid<br>1 = frame sent successfully<br>2 = frame failed: excessive retries<br>3 = frame failed: lost |
| rate | 5 | 29-25 | data rate at which packet was transmitted (rates specified in Table 64) |
| retries | 5 | 24-20 | total number of retries for transmitted packet |
| channel | 8 | 19-12 | Channel on which frame was transmitted |
| seq | 12 | 11-0 | transmission sequence number modulo 4096<br>NOTE 1: although the corresponding sequence field in the WISP header is 16 bits, only the lower 12 bits are supplied in this field since this is adequate for the Wireless Switch to uniquely identify the results. |

When the radio has received a message that is to be forwarded to the Wireless Switch, it fills in the TxResults1 and TxResults2 fields of the frames that contain the encapsulated message as follows, depending on what has or has not already been reported to the Wireless Switch:

If all data sent by the Wireless Switch to the radio to be forwarded has been forwarded and the results have been reported to the Wireless Switch, both fields are set to zero.

If only 1 message sent from the Wireless Switch has been forwarded and not reported, the TxResults1 field is filled in with information regarding the last (or only) fragment of that message and TxResults2 is set to 0.

If more than 1 message sent from the Wireless Switch has been forwarded and not reported, the TxResults1 is filled in with information regarding of the oldest unreported message and the TxResults2 field is filled in with information regarding of the next oldest unreported message.

A portal can report lost frames by setting the "ok" subfield equal to 3, the "seq" subfield to the sequence number that was lost, and setting the rest of the subfields to 0.

If the Access Port has forwarding results ready to report, but there are no received frames waiting to be sent to the Wireless Switch, the radio will create and send UpdateResults messages to the Wireless Switch soon after the transmit results are known to the Access Port. The TxResults1 and TxResults2 fields are filled in as described above. How long a portal hangs on to unreported results before creating and sending an UpdateResults message is implementation dependent, but in general this time should be minimized.

The results reported to the Wireless Switch may not be in sequence. Each radio is free to transmit Data frames in whatever order it deems most efficient, but transmit results must be sent back to the Wireless Switch in the same order as the results become known to the radio.

The Rx Data field is filled in the body of the Wireless Data Packet that contains the last fragment of that message using the format of Table 63. The RSSI sub-field contains the relative signal strength with which the message was received (if the Portal is a radio), as reported by the supporting hardware. The rate sub-field contains the encoded data rate of the received message (if the Portal is a radio). Encoding of the data rate is shown in Table 64 below. The format for the channel field is shown in Table 65.

TABLE 63

Format of the Rx Data field.

| field | length (bits) | bit # | description |
|---|---|---|---|
| RSSI | 8 | 15-8 | receive signal strength indicator |
|  | 3 | 7-5 | Not used |
| rate | 5 | 4-0 | receive data rate (see Table 64) |

TABLE 64 data rate values.

| value | rate (MBPS) |
|---|---|
| 0 | 1 |
| 1 | 2 |
| 2 | 5.5 |
| 3 | 6 |
| 4 | 9 |
| 5 | 11 |
| 6 | 12 |
| 7 | 18 |
| 8 | 22 |
| 9 | 24 |
| 10 | 36 |
| 11 | 48 |
| 12 | 54 |

TABLE 65

Format of the channel field.

| Field | length (bits) | bit # | description |
|---|---|---|---|
| channel | 8 | 7-0 | Channel this frame was received on |
| Reserved | 8 | 15-8 | Not used |

The format for the header field and body of a data message from the wireless switch to a radio is shown in Table 66 and 67.

TABLE 66

Wireless Data message header (Data from Wireless Switch to portal)

| Field | size in bytes | Byte offset from start of message | description |
|---|---|---|---|
| Destination | 6 | 0 | Radio MAC address |
| Source | 6 | 6 | Wireless Switch MAC address |
| Ethertype | 2 | 12 | 0x8783 |

TABLE 66-continued

Wireless Data message header (Data from Wireless Switch to portal)

| Field | size in bytes | Byte offset from start of message | description |
|---|---|---|---|
| Command | 2 | 14 | 0x9101 (if frame body contains a complete packet) 0x9103 (if frame body contains $1^{st}$ of 2 fragments) 0x9104 (if frame body contains $2^{nd}$ of 2 fragments) |
| Sequence | 2 | 16 | 0-65535 NOTE: The Sequence value shall be constant for a given pair of Wireless Data messages of Command types 0x9103 and 0x9104 (i.e. fragments share a single sequence number) |
| Length | 2 | 18 | D + 14 (see Table 67) |

TABLE 67

Wireless Data message body (Data from Wireless Switch to portal)

| field | size in bytes | Byte offset from start of message body | description |
|---|---|---|---|
| Start Rate | 2 | 0 | Initial transmission rate to attempt, encoded as described in Table 4.5. |
| Allowed Rates | 4 | 2 | Bit map of allowed transmission rates (see Table 68) |
| Transmit Control | 2 | 6 | Information about the frame to be transmitted (see Table 69 for details). |
| Reserved | 6 | 8 | Reserved for future growth. NOTE: The number of bytes in any Wireless Data message type, prior to the actual data frame, is consistent regardless of the message direction. |
| Data Frame | D | 14 | 802.11 data frame to be transmitted by the portal |

The bit map values for any transmit rate, including the Allowed Rates field in Table 67, is shown below in Table 68. The top row is the bit number. The bottom row is the data rate in megabits per second.

TABLE 68

Rate bit map.

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
|  |  |  | 54 | 48 | 36 | 24 | 22 | 18 | 12 | 11 | 9 | 6 | 5.5 | 2 | 1 |

The Transmit Control field is set forth in Table 69. The priority field is intended to allow flexibility in support of Quality of Service mechanisms. Where such mechanisms are not in place the field is set to zero.

The group field specifies the priority group to which this message belongs.

The relationship between Priority Group and Priority is as follows: Each priority group may be sub-divided into up to 16 priorities. Any message in one priority group has priority over any message in a lower-numbered priority group, regardless of the value of their respective priority fields.

The profile field specifies a retry algorithm. More specifically, the RF Port uses this value to determine the following information for each transmission:

Maximum contention window (CW) for each transmission attempt

Maximum number of retries to be attempted

When to lower the Tx rate

The retry algorithm to be used is not specified by the protocol. Instead, it is up to the implementation to define the appropriate transmit profile for each of the five profile types.

TABLE 69

Transmit Control field.

| field | Length (bits) | bit # | description |
|---|---|---|---|
| priority | 8 | 15-8 | 0 |
| group | 4 | 7-4 | priority groups: 0 = normal (lowest priority group) 1 = DTIM/BCMC 2 = management/voice (highest priority group) |
| profile | 4 | 3-0 | tx profile: 0 = BC/MC 1 = Data 2 = Voice Data 3 = Voice MC 4 = Management Frame |

Flow control allows for the efficient movement of data from a Wireless Switch to a portal. It also ensures that data will not be sent to a portal that doesn't have room for it. There are two distinct types of data that flow control applies to: immediate and bulk-delayed. Each type is handled with a different method of flow control.

Immediate Wireless Data messages are flow-controlled via the Sequence fields in their headers, and the Flow Control Window field in the bodies of upstream (i.e. from portal to Wireless Switch) Wireless Data, UpdateResults, and DTIM-Poll messages. The Flow Control Window field allows a portal to advertise to the Wireless Switch how much room it has left to accept additional Wireless Data messages. This room is expressed in terms of a "window" of sequence numbers, where the Flow Control Window value is the last sequence number that can be accepted. As a portal transmits data via RF, it frees up additional buffer space and subsequently advertises a new window in the next Wireless Data, UpdateResults, or DTIMPoll message it transmits. The advertised window will always be either equal to or larger than the last advertised window (excluding the 16-bit wrap-around case).

Bulk-delayed Wireless Data messages are flow-controlled via the DTIMPoll message. This message is sent prior to an imminent DTIM time, and signals the Wireless Switch to send all buffered non-directed data to the portal that requested it, up to the limit specified within the DTIMPoll message. The sequence numbering for bulk-delayed Wireless Data messages is separate from immediate Wireless Data messages, and each portal must maintain a separate memory area for each data type. Receipt of (and subsequent RF transmission of) bulk-delayed Wireless Data messages have NO impact on the value of the Flow Control Window field.

The UpdateResults message is sent to the Wireless Switch by a Radio when information is available regarding the status of one or more completed data forward (transmit) operation(s) and no data that has been received is pending to be sent to the Wireless Switch. The Tx Results fields are filled in as described above. The TxResults 1 and TxResults 2 fields are always included in this message, even if there is only one result to report (in that case, the Tx Results2 field would be invalid). Additional TxResults can be appended to this message as necessary.

This message also serves to update the Wireless Switch with the latest flow control information. The format for the UpdateResults message is set forth in Tables 70 and 71.

FIG. 70 UpdateResults message header.

| Field | size in bytes | Byte offset from start of message | description |
|---|---|---|---|
| Destination | 6 | 0 | Wireless Switch MAC address |
| Source | 6 | 6 | Radio MAC address |
| Ethertype | 2 | 12 | 0x8783 |
| Command | 2 | 14 | 0x2010 |
| Sequence | 2 | 16 | 0-65535 |
| Length | 2 | 18 | 2 + (N * 4), where N is the number of Tx Results included in the body of this message |

FIG. 71 UpdateResults message body.

| Field | size in bytes | Byte offset from start of message body | Description |
|---|---|---|---|
| Flow Control Window | 2 | 0 | Future sequence number corresponding to the last immediate Wireless Data message that can be received, given the currently available buffers in the portal |
| Tx Results 1 | 4 | 2 | Allows results of a completed frame transmission to be reported (see Table 62 for details) |
| Tx Results 2 | 4 | 6 | Allows results of a $2^{nd}$ completed frame transmission to be reported (see Table 62 for details) |
| Reserved | 4 | 10 | Unused |
| Number of Results | 2 | 14 | Number of additional Tx Results fields included in this message (doesn't include the two Tx Results fields above: they are always present). Valid range: 0-100 |
| Tx Results_1 | 4 | 16 | Results for first extra unreported frame (see Table 62 for details) |
| Tx Results_N | 4 | 16 + 4*(N − 1) | Results for Nth extra unreported frame (see Table 62 for details). NOTE: The maximum value of N is 100. |

The radio sends theDTIM_Poll message to the Wireless Switch to request that any stored (buffered) broadcast or multicast messages be sent. The amount of time between the DTIM_Poll and DTIM time is implementation dependant. When the DTIM time occurs, the radio will transmit any broadcast or multicast messages that it has received since the last DTIM.

This message also serves to update the Wireless Switch with the number of currently available transmit buffers (non-DSP) for this radio.

This message can be used to send any previously unreported TxResults to the Wireless Switch. Zero, one, or two valid TxResults may be included, but the TxResults 1 and TxResults 2 field are always present even if they don't contain valid data. The format for the DTIM_POLL message is set forth in Tables 72 and 73.

TABLE 72

DTIM_Poll message header.

| Field | size in bytes | Byte offset from start of message | description |
|---|---|---|---|
| Destination | 6 | 0 | Wireless Switch MAC address |
| Source | 6 | 6 | Radio MAC address |
| Ethertype | 2 | 12 | 0x8783 |
| Command | 2 | 14 | 0x2011 |
| Sequence | 2 | 16 | 0-65535 |
| Length | 2 | 18 | 8 |

TABLE 73

DTIM_Poll Message Body.

| Field | size in bytes | Byte offset from start of message body | description |
|---|---|---|---|
| Flow Control Window | 2 | 0 | Future sequence number corresponding to the last immediate Wireless Data message that can be received, given the |

TABLE 73-continued

DTIM_Poll Message Body.

| Field | size in bytes | Byte offset from start of message body | description |
|---|---|---|---|
| | | | currently available buffers in the portal |
| Tx Results 1 | 4 | 2 | Allows results of a completed frame transmission to be reported (see FIG. 4.2 for details) |
| Tx Results 2 | 4 | 6 | Allows results of a 2$^{nd}$ completed frame transmission to be reported (see FIG. 4.2 for details) |
| Reserved | 4 | 10 | Unused |
| Last Sequence | 2 | 14 | Value of the Sequence field in the header of the last received immediate Wireless Data message |
| Portal Type | 2 | 16 | Old or New. 0 => old (DSP based) 1 => new |
| Capacity | 2 | 18 | Bulk-delayed Wireless Data message transmit capacity. If the portal type field above is 0, then this value is in bytes. If the portal type field above is 1, then this value is in buffers. |
| BSS Index | 2 | 20 | Index of BSSID that is requesting its bulk-delayed Wireless Data messages. Valid range = 0-3 (4 BSSIDs supported) |

The process by which an Access Port becomes associated with (or adopted by) a Wireless Switch is called the Access Port Adoption Process (APAP). Some WISP messages are used only during this Adoption Process.

The following illustrates the possible normal initialization message sequences between a Wireless Switch and an Access Port.

The first section describes a normal successful download between the Wireless Switch and a multi-portal access port. The second section describes the message exchanges between a multi-portal access port and the Wireless Switch when no Wireless Switches are configured to adopt the port. The third section describes the message exchanges between a DSP based Access Port, as shown in FIG. 2, and a Wireless Switch.

The following table summarizes message exchanges when the Access Port begins the sequence with a Hello message and at least one Wireless Switch is configured to adopt the Access Port.

| Message | Source | Destination | Next Expected Message | Notes |
|---|---|---|---|---|
| Hello | Access Port | Broadcast | Parent | |
| Parent | Wireless Switch | Access Port | LoadMe | The FIRST Parent message received by the Access Port determines the Access Port's Parent. |
| LoadMe | Access Port | Broadcast | LoadImage | |
| LoadImage | Wireless Switch | Access Port | Ack | Access Port accepts LoadImage messages only from it's Parent. |
| Ack | Access Port | Wireless Switch | LoadImage or LoadDone | LoadImage, Ack sequence continues until file download completes as indicated by LoadDone |
| LoadDone | Wireless Switch | Access Port | DeviceInfo | |
| DeviceInfo | Access Port | Broadcast | Ack | DeviceInfo informs all Wireless Switches of the capabilities of the Access Port. |
| Ack | Wireless Switch | Access Port | ConfigMe | Access Port accepts Ack only from its Parent. |
| ConfigMe | Access Port | Wireless Switch | Configuration Status | |
| Configuration Status | Wireless Switch | Access Port | | |
| Ack | Access Port | Wireless Switch | | Normal operations begin after this point |

The following summarizes message exchanges when NO Wireless Switches are configured to adopt the Access Port.

| Message | Source | Destination | Next Expected Message | Notes |
|---|---|---|---|---|
| Hello | Access Port | Broadcast | Parent | The Access Port sends ten Hello messages. No response is received from any Wireless Switch. |
| LoadMe | Access Port | Broadcast | LoadImage | The Access Port gets its firmware download from the first Wireless Switch to reply to the LoadMe. |
| LoadImage | Wireless Switch | Access Port | Ack | |
| Ack | Access Port | Wireless Switch | LoadImage or LoadDone | LoadImage, Ack sequence continues until file download completes indicated by LoadDone |
| LoadDone | Wireless Switch | Access Port | DeviceInfo | |
| DeviceInfo | Access Port | Broadcast | | DeviceInfo informs all Wireless Switches of the capabilities of the |

-continued

| Message | Source | Destination | Next Expected Message | Notes |
|---|---|---|---|---|
| | | | | Access Port. The DeviceInfo message is sent five times. The portal then resets. |

The following summarizes message exchanges when an Access Port begins the initialization sequence with a LoadMe message rather than a Hello message.

| Message | Source | Destination | Next Expected Message | Notes |
|---|---|---|---|---|
| LoadMe-old | Access Port | Broadcast | LoadImage-old | The Access Port gets its firmware download from the first Wireless Switch to reply to the LoadMe. |
| LoadImage-old | Wireless Switch | Access Port | Ack-old | |
| Ack-old | Access Port | Wireless Switch | LoadImage-old or LoadDone-old | LoadImage, Ack sequence continues until file download completes as indicated by LoadDone |
| LoadDone-old | Wireless Switch | Access Port | Device-Info | |
| Device-Info | Access Port | Broadcast | Ack | The Parent field of the DeviceInfo message does not exist. If a Wireless Switch chooses to Adopt this Access Port, the Wireless Switch responds to the DeviceInfo with an Ack. |
| Ack | Wireless Switch | Access Port | Device-Info | This Ack informs the Access Port that the Wireless Switch is now its "Parent". |
| Device-Info | Access Port | Broadcast | Ack | The Parent field of this DeviceInfo message now contains the MAC address of the Wireless Switch that sent the above Ack. |
| Ack | Wireless Switch | Access Port | ConfigMe | This Ack confirms the adoption. |
| ConfigMe | Access Port | Wireless Switch | Configuration | |
| Configuration | Wireless Switch | Access Port | Status | |
| Status | Access Port | Wireless Switch | | Normal operations begin after this point |

After each portal is configured, it begins normal operation. During normal operation with no traffic, the Wireless Switch sends a "Heartbeat" message to each portal once per second. The portal sends a "status" message to the Wireless Switch every 5 s.

| Access Port | | Wireless Switch |
|---|---|---|
| 1) | <-- | Heartbeat (1) |
| 2) | <-- | Heartbeat (2) |
| 3) | <-- | Heartbeat (1) |
| 4) | <-- | Heartbeat (2) |
| 5) | <-- | Heartbeat (1) |
| 6) | <-- | Heartbeat (2) |
| 7) | <-- | Heartbeat (1) |
| 8) | <-- | Heartbeat (2) |
| 9) | <-- | Heartbeat (1) |
| 10) | <-- | Heartbeat (2) |
| 11) Status (1) | --> | |
| 12) Status (2) | --> | |

If any portal misses the Heartbeat for 10 s, the Access Port resets and starts again at phase 1.

During normal operation, if an 802.11a radio detects radar, transmission on the current channel will cease. The 802.11a portal will send a Status message with a "radar detect" indication. At this point, normal forwarding operations will cease. The Access Port will remain in this state (as if no Active ESS's are defined) until another Configuration message is received from the Wireless Switch. The next Configuration message will determine the next action taken by the Access Port. The next Configuration message may indicate that the Access Port shall perform ACS (described below). The Configuration message may simply indicate which channel to use. In this case, the Access Port shall continue normal operation on the channel indicated in the Configuration message.

The Switch may direct the Access Port to perform ACS at any time. The following steps are involved in the ACS process:

The Switch sends a Configuration message to Access Port with the Automatic Channel Scan bit set. The ACS bit is in the Option Mask field (Element ID 0x2E) of the Configuration message. When this message is received by the Access Port, all normal forwarding operations will cease. This will be operationally identical to having no Active ESS. The Heartbeat and Status message exchanges will continue during ACS.

In the same Configuration message, the Allowed Channels Field (0x2F) will define the list of channels (one or more) to use in the process.

When the Access Port begins the process, the Access Port will send a Status message to the Wireless Switch with the Auto Channel scan field (0x50) set to 0xffff.

The Access Port will start with the first channel indicated in the Allowed Channels Field (0x2F), and sequentially process each channel as follows:
1) The Access Port will "listen" for 200 milliseconds. The Access Port will encapsulate each beacon heard on the channel in a WISP header and send it to the Wireless Switch. The WISP frame format will indicate the channel on which the beacon was heard, as indicated in Table 61 and the received signal strength (RSSI), as indicated in FIG. 63.
2) If radar is detected during ACS, a Status message will be sent from the Access Port to the Wireless Switch with the Radar Detect (0x53) indication.
3) At any point during ACS, the Wireless Switch may send a Reset (Command 0x8002).
4) When all channels indicated in the Allowed Channels Field (0x2F) have been processed by the Access Port, the Access Port will send a Status message to the Wireless Switch with the Auto channel scan field set to 0xFFFE. This informs the Wireless Switch that that the scan process is complete and no more beacons will forwarded.
5) When the Wireless Switch receives Status message indicating "Scan Complete", the Wireless Switch will evaluate the forwarded beacons (and any Radar Detect indications). When the evaluation is complete, the Wireless Switch will send a new Configuration Packet to the Access Port that indicates the Selected Channel.
6) As soon as the newly indicated channel becomes effective, the Access Port will send a Status message that indicates the new Configuration Sequence number (0x51), and the number of the assigned channel (0x50). At this point normal forwarding operations continue.

Several messages sent by the Access Port have timeouts, repeat intervals, and differing behaviors depending on whether they timeout or receive the expected response. The following is a summary. A Reset returns the Access Port to the Access port Adoption Process.

it received, it must discard that packet. Care must be taken to ensure that this mechanism works through wrap-around of the sequence number back to zero.

While there have been described what are believed to be the preferred embodiments of the present invention, those skilled in the art will recognize that other and further changes and modifications may be made thereto without departing from the spirit of the invention, and it is intended to claim all such changes and modifications as falls in the scope of the invention.

We claim:

1. In a wireless local area network comprising a wireless switch which controls the operation of an access port coupled to the wireless switch and which manages data communications with the access port, wherein said access port comprises at least two radio portals each wirelessly communicating data to other mobile unit devices, a method for configuring one of the radio portals of said access port, the method comprising:
downloading software from said wireless switch to said access port for operation of said access port;
signaling data from said access port which identifies one of the radio portals of said access port; and
downloading data from said wireless switch to said access port to configure the identified radio portal of said access port.

2. In a wireless local area network comprising a wireless switch which controls the operation of an access port comprising at least two radio portals each communicating data to other devices, a method for selecting a channel of operation for a selected one of said radio portals, the method comprising:
sequentially monitoring each of a plurality of possible channels using said selected radio portal to detect beacon signals on said possible channels;
forwarding received beacon signals to a wireless switch controlling operation of said access port having said radio portal;

| Message from Access Port | Expected Response Message from Wireless Switch | Repeat Interval | Expiration Time | Action after Expected Response | Action after timeout waiting for Expected Response |
|---|---|---|---|---|---|
| Hello | Parent | 1 Sec | 10 Sec | Send LoadMe with a non-null Parent field | Send LoadMe with a NULL parent field |
| LoadMe | LoadImage | 1 Sec | 10 Sec | Send next LoadMe | Reset |
| LoadMe | LoadDone | 1 Sec | 10 Sec | Send DeviceInfo | Reset |
| DeviceInfo | Ack | 1 Sec | 10 Sec | Send ConfigMe | Reset |
| ConfigMe | Configuration | 3 Sec | 9 Sec | Start normal operation | Reset |
| Status | None | 5 Sec | None | None | None |
| Unsolicited | Heartbeat | 1 Sec | 10 Sec | Update Heartbeat Info | Reset |

The sequence number field in the Wireless Data Packet is used to detect packets that have gotten out of order due to possible differing paths through the switch fabric between a Wireless Switch and a Radio. Each entity (Wireless Switch and Radio) must keep track of the sequence number of the last Wireless Data Packet that it received. If it receives a Wireless Data Packet with a sequence number that is lower than the last analyzing said received beacon signals using said wireless switch to select a channel for operation of said selected radio portal; and sending a configuration message from said wireless switch to said selected radio portal to configure said selected radio portal to operate on said selected channel.

3. A method as specified in claim 2 wherein said wireless switch sends a control message to said access port designating said possible channels.

4. A method as specified in claim 2 wherein said access ports send signal strength data to said wireless switch with said received beacon signals.

5. A method as specified in claim 4 wherein said access port sends said received beacon signals to said wireless switch using a signal format identifying a channel on which said beacon signal was received.

* * * * *